United States Patent [19]
Haaland

[11] Patent Number: 5,850,111
[45] Date of Patent: Dec. 15, 1998

[54] FREE PISTON VARIABLE-STROKE LINEAR-ALTERNATOR GENERATOR

[75] Inventor: Carsten M. Haaland, Dadeville, Ala.

[73] Assignee: Lockheed Martin Energy Research Corp., Oak Ridge, Tenn.

[21] Appl. No.: 876,435

[22] Filed: Jun. 16, 1997

Related U.S. Application Data

[63] Continuation-in-part of Ser. No. 874,517, Jun. 13, 1997, which is a continuation-in-part of Ser. No. 238,281, May 5, 1994, Pat. No. 5,637,935.

[51] Int. Cl.⁶ .......................... H02K 33/00; F01B 29/10; F02G 1/043
[52] U.S. Cl. ................................ 310/15; 60/517; 60/525
[58] Field of Search ................................ 310/36, 15, 17, 310/30, 168

[56] References Cited

U.S. PATENT DOCUMENTS

| | | | |
|---|---|---|---|
| 4,602,174 | 7/1986 | Redlich | 310/15 |
| 5,473,205 | 12/1995 | Haaland | 310/11 |
| 5,637,935 | 6/1997 | Haaland | 310/11 |
| 5,706,659 | 1/1998 | Houtman et al. | 60/517 |

*Primary Examiner*—Nestor Ramirez
*Assistant Examiner*—Judson H. Jones
*Attorney, Agent, or Firm*—Morgan & Finnegan, L.L.P.

[57] ABSTRACT

A free-piston variable stroke linear-alternator AC power generator for a combustion engine. An alternator mechanism and oscillator system generates AC current. The oscillation system includes two oscillation devices each having a combustion cylinder and a flying turnbuckle. The flying turnbuckle moves in accordance with the oscillation device. The alternator system is a linear alternator coupled between the two oscillation devices by a slotted connecting rod.

20 Claims, 5 Drawing Sheets

FREE PISTON VARIABLE-STROKE LINEAR-ALTERNATOR GENERATOR

RELATED APPLICATIONS

This application is a continuation in part of copending U.S. application Ser. No. 08/874,517, entitled "SINGLE CHANNEL DOUBLE-DUCT LIQUID METAL ELECTRICAL GENERATOR USING A MAGNETOHYDRODYNAMIC DEVICE", filed Jun. 13, 1997, which is a continuation in part of U.S. application Ser. No. 08/238,281, entitled "DOUBLE-DUCT LIQUID METAL MAGNETOHYDRODYNAMIC ENGINE", filed May 5, 1994, now U.S. Pat. No. 5,637,935 which is incorporated by reference as if fully set forth herein.

This invention was made with Government support under contract DE-AC05-840R21400 awarded by the U.S. Department of Energy to Lockheed Martin Energy Systems, Inc. and the Government has certain rights in this invention.

FIELD OF THE INVENTION

The present invention relates to a free-piston variable-stroke linear-alternator AC power generator for a combustion engine and, more specifically, to an alternator mechanism and an oscillation system for generating AC current.

BACKGROUND OF THE INVENTION

Free-piston combustion-engine AC electric power generators using liquid metal to provide variable stroke are disclosed in U.S. Pat. No. 5,473,205 to Haaland. This reference discloses a double-duct liquid metal magnetohydrodynamic engine. Liquid metal, however has the disadvantage and danger of spontaneously combusting in the event of an accidental rupture of the liquid metal container. Further, there is the problem of friction due to the requirement of a liquid metal piston used in conjunction with each combustion piston. In addition, because liquid metal can push but cannot pull, control of the desired compression ratio is a problem. That is, if pulling is attempted in the liquid metal generator used on an engine, i.e., if the portion of the moving system behind the magnetohydrodynamic device is made to move slower than the compression piston, cavitation will result. Additionally, there are ohmic losses due to the use of liquid metal.

Other types of linear alternator generators are not capable of operation through a sufficiently large variation in stroke-length to accommodate variations in power demand, such as diurnal variations in power demand for stationary power production, or load variations for powering the movement of vehicles.

SUMMARY OF THE INVENTION

An object of the present invention is to provide a linear-alternator mechanism and an oscillation system for obtaining a high efficiency variable-stroke electric generator without employing a liquid metal magnetohydrodynamic device.

Another object of the present invention is to provide a piston rigidly attached to a plunger of the linear-alternator to obtain better operation control.

A further object of the present invention is to provide a free-piston variable-stroke linear-alternator generator which eliminates the need for liquid metal and thus increases efficiency.

These and other objects of the present invention are achieved by providing a free-piston variable-stroke generator including an oscillating apparatus for obtaining variable stroke and an alternator apparatus for generating AC electric potential based on the output of the oscillating apparatus.

The alternator apparatus can include linear-alternators having moving magnets or fixed magnets and a plunger. The oscillating apparatus can include internal combustion cylinders and turnbuckle apparatuses. The internal combustion cylinders can include a piston, a sliding exhaust-port sleeve, and a connecting rod. Each turnbuckle apparatus can include a turnbuckle screw, a slotted turnbuckle sleeve surrounding the turnbuckle screw, a sleeve turning gear surrounding the slotted turnbuckle sleeve and a selsyn-driven gear.

Other objects, advantages, and salient features of the invention will become apparent from the following detailed description which, when taken in conjunction with the annexed drawings, discloses preferred but non-limiting embodiments of the invention.

BRIEF DESCRIPTION OF THE DRAWINGS

FIG. 3, including FIG. 4, including

DESCRIPTION OF THE PREFERRED EMBODIMENTS

Figure 1:
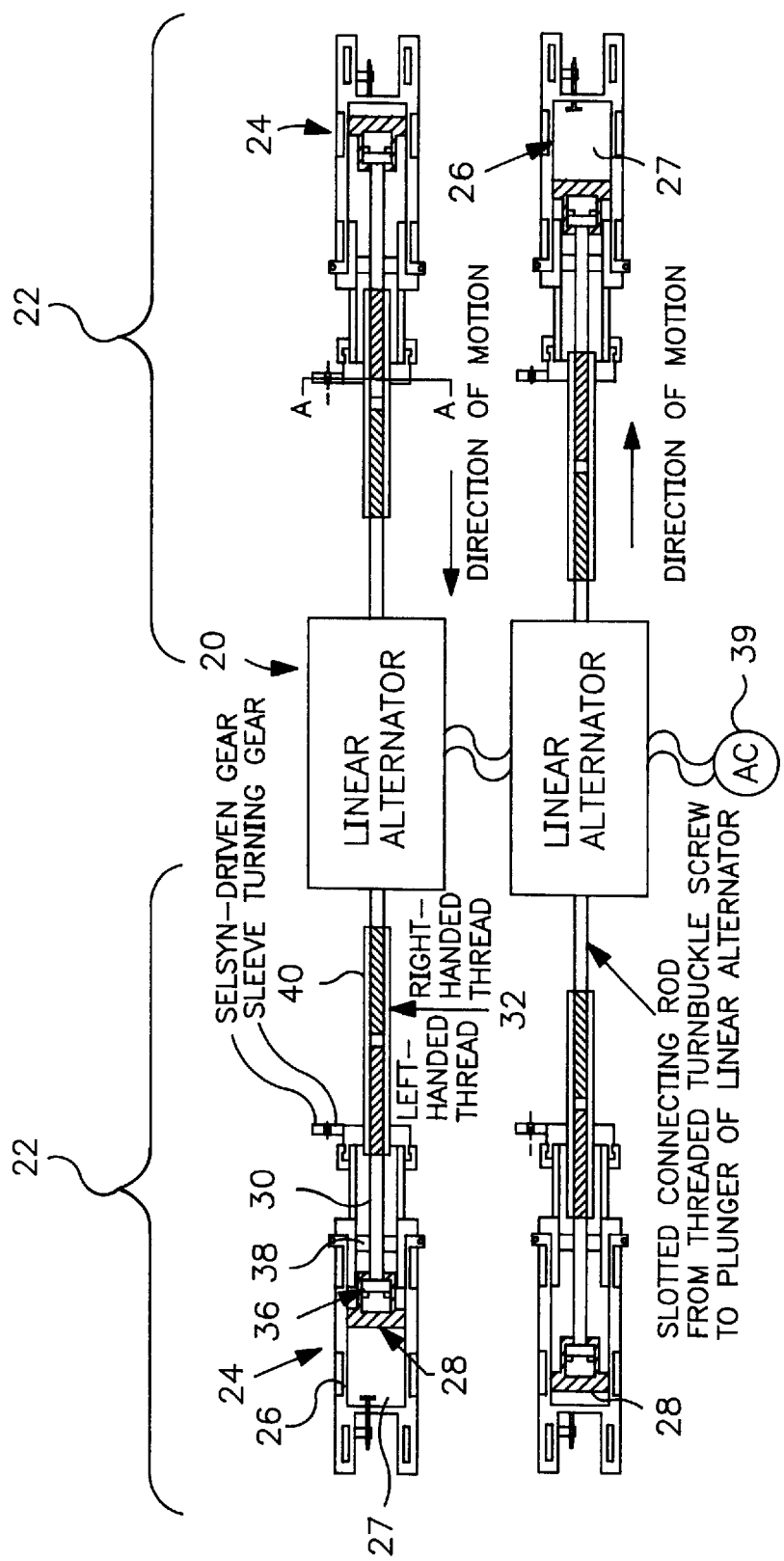
FIG. 1 is a diagram of a free-piston variable-stroke generator according to the present invention.

The present invention will be discussed with respect to FIG. 1 which shows a free-piston variable-stroke generator. Although FIG. 1 shows, and the description will be given with respect to two systems, it is apparent that one system, or more than two systems can be employed.

Each of a pair of linear alternators 20 is connected between two separate and opposing oscillating devices 22. Each of the pair of oscillating devices 22 includes an internal combustion cylinder 24, a sliding exhaust-port sleeve 26 defining an exhaust port 27, a piston 28, a connecting rod 30, and a "flying" turnbuckle 32 oscillating with the piston 28. The turnbuckle 32 transmits linear axial oscillating motion to the plunger of the linear alternator 20 attached thereto, causing alternating electrical current to be generated. Each piston 28 is attached to the slotted connecting rod 30 by a push-pull bearing 36 which allows the piston 28 to rotate freely. Such rotating capability has the advantage of reducing wear on cylinder walls. Each connecting rod 30 is joined and is integral with the interior turnbuckle screw 42 shown in FIG. 2 and as the portion with left-handed thread in FIG. 1. Another of the pair of turnbuckle screws 42 in each turnbuckle 32 has right-handed threads and is joined and is integral with the connecting rod joined with the plunger of the linear alternator. The shaft of the connecting rod to the plunger is slotted longitudinally along its length and engages fixed stationary lugs to prevent the connecting rod and the plunger from rotating while it oscillates longitudinally.

Figure 2:
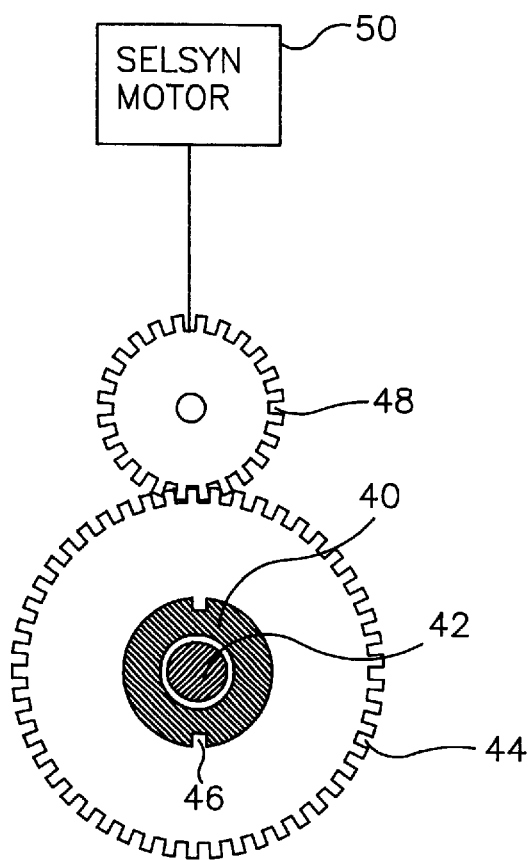
FIG. 2 is a view taken along the line A—A of FIG. 1 of a flying turnbuckle used in FIG. 1.

Both the left-handed and right-handed turnbuckle screws are enclosed by the rotatable turnbuckle sleeve 40 (FIGS. 1 and 2) which has matching threads internally that match the threads of the turnbuckle screws. Rotation of the turnbuckle sleeve 40 causes the turnbuckle screws 42 to move axially apart or closer together, depending on the direction of rotation of the turnbuckle sleeve 40. As shown in FIG. 2, a sleeve turning gear engages the slotted rotatable turnbuckle sleeve 40 in order to rotate the turnbuckle sleeve. The sleeve turning gear remains fixed axially. The sleeve turning gear has a lug 46 that engages a slot in the slotted turnbuckle sleeve 40. A selsyn-driven gear 48 connects with the sleeve turning gear 44. The selsyn-driven gear 48 is driven by a selsyn motor 50.

When the sleeve turning gear 44 is rotated by the selsyn-driven gear 48, the slotted turnbuckle sleeve 40 is also rotated, while sliding back and forth axially, causing the total length of the oscillating system to be increased or decreased according to the direction of rotation of the slotted turnbuckle sleeve 40. When the total length of the oscillating system is increased, the stroke length of the piston 28 and plunger associated with each of the linear alternators 20 is decreased. When the total length of the oscillating system is decreased, the stroke length of the piston 28 and the linear alternator 20 is increased. The stroke length is controlled by rotations of the selsyn motor 50. When the stroke length is changed, the sliding exhaust-port sleeve 26 is moved so that the exhaust-port 27 is located in an appropriate position according to a desired stroke length using any suitable actuator means (not shown) respectively coupled to each turnbuckle sleeve 40.

Each oscillating system is accelerated by the force of expanding combustion gases acting on one of the pistons 28. The velocity of each oscillating system is opposed throughout its entire motion by the drag of the plunger in the linear alternator 20 and by friction, and throughout the last part of its motion due to compression of the gas-fuel mixture in an opposing cylinder. The frequency of oscillation is controlled by the quantity of fuel metered to a combustion chamber using computer-controlled fuel injection and by the plunger drag which depends on an external load. The external load seen by the linear alternator 20 can be controlled by electronic switches (not shown) in conjunction with a number of ultra-capacitors (not shown) in an external circuit. Ultra-capacitors are very large capacity capacitors which can store or release up to 1 MW per cubic foot.

The linear alternators 20 are linear induction electrodynamic devices of the same type. The linear alternators 20 are coupled to provide an AC output power source 39 which yields the sum of power produced by each of the linear alternators 20. The AC output power source provides a variable frequency and variable power source. The linear alternators 20 can include moving magnets (permanent magnets) attached to the plunger or fixed magnets (stationary magnets) with a plunger including a specially shaped laminated iron core. A type of permanent magnet (moving magnet) which can be used is disclosed in U.S. Pat. No. 4,602,174 to Robert W. Redlich and is referred to as a permanent magnet linear alternator (PMLA).

A type of stationary magnet which can be used is described in "Assessment of 25 kW Free-Piston Stirling Technology Alternatives for Solar Applications," by Raymond Erbeznik, et. al., *Proc. of the 27th Intersociety Energy Conversion Engineering Conference*, San Diego, Calif., August 1992, pp. 5.237–5.242. This reference refers to stationary magnet linear alternators (SMLA).

Both PMLA and SMLA types with superior magnetic flux coupler are described in U.S. Pat. No. 5,389,844, which is incorporated by reference as if fully set forth herein.

It is preferable to use an SMLA configuration because it has some advantages over a PMLA configuration. These advantages include reduction of mechanical vibration and shock to the permanent magnets because the magnets in the SMLA's are not oscillating back and forth which may cause them to gradually lose their magnetism, simplified installation of the magnets and possible reduction of the plunger mass.

Figure 3A:
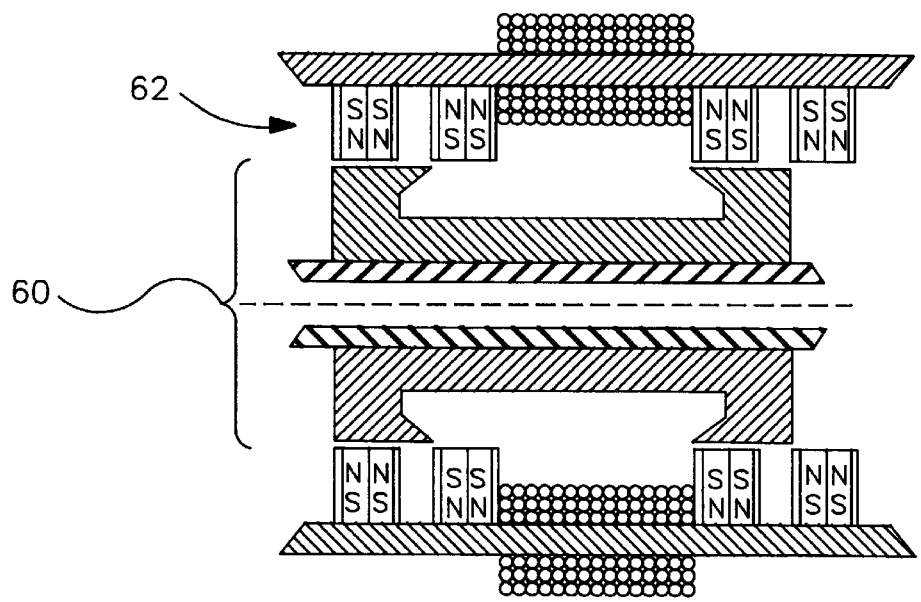
FIGS. 3A and 3B, is a cross-sectional view of a representational single-stage Stationary Magnet Linear Alternator (SMLA) plunger in the linear alternator in FIG. 1.
Figure 3B:
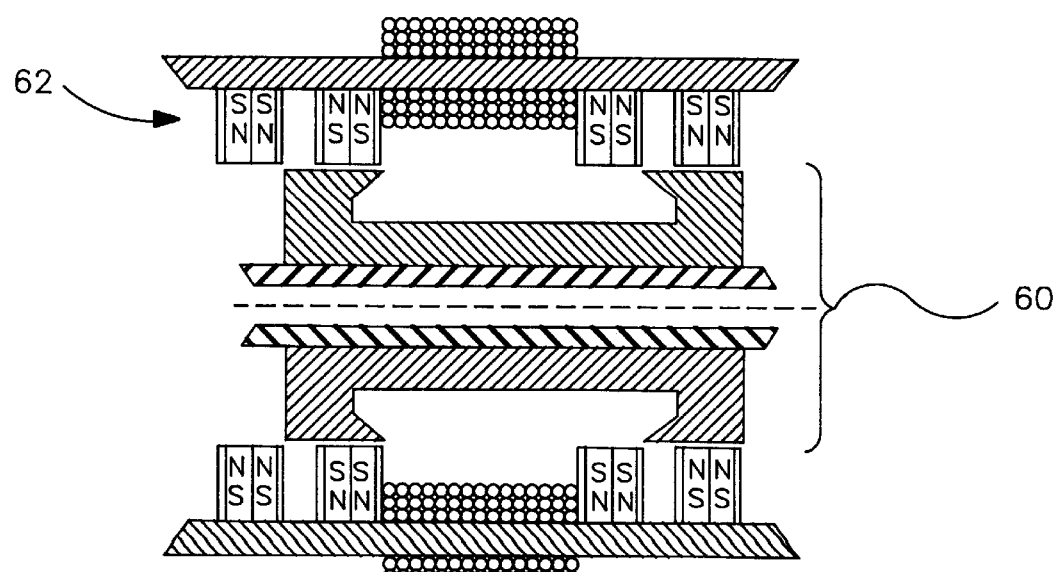
Figure 4A:
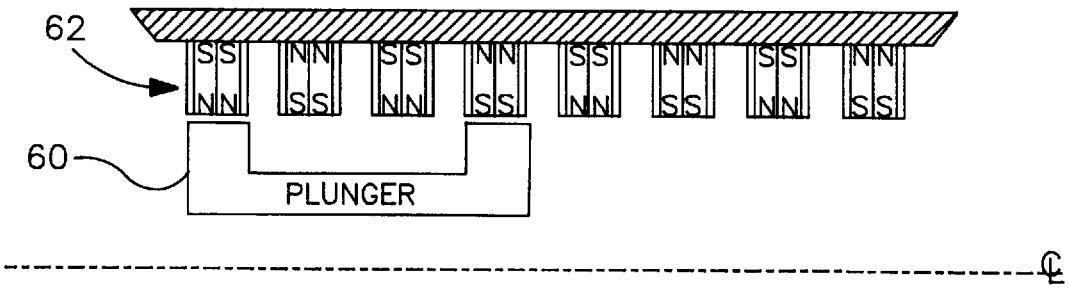
FIGS. 4A, 4B, and 4C, is a cross-sectional view of the representational multi-stage SMLA plunger at various phases as the pistons and turnbuckle assemblies in FIG. 1 are moved.
Figure 4B:
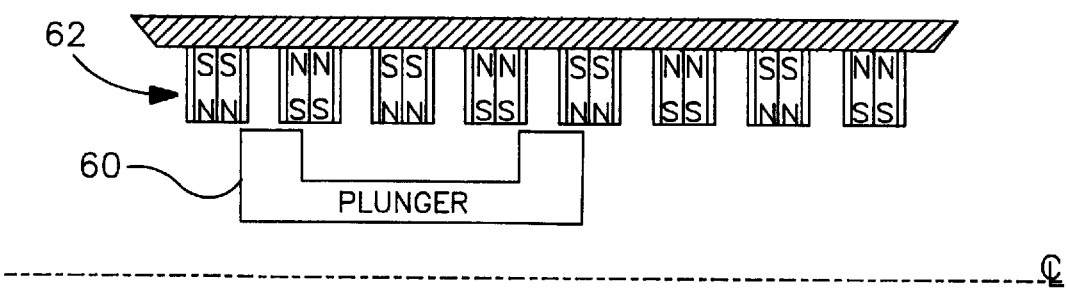
Figure 4C:
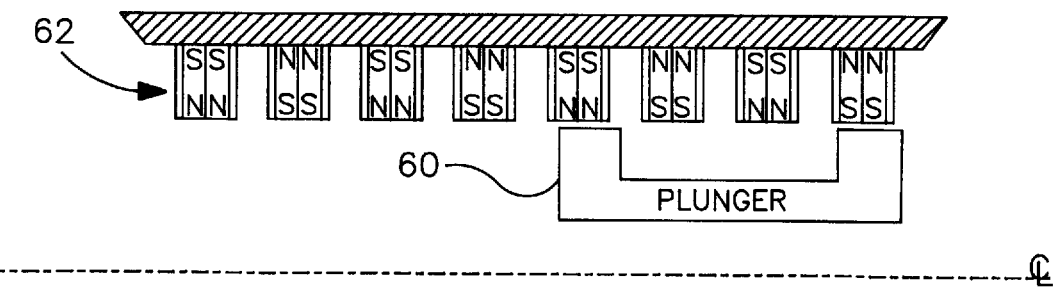

In the linear alternator 20 for a variable-stroke engine, if a simple sinusoidal electrical output is desired, the linear alternator must be designed so that the magnetic flux through the core of the coil varies nearly linearly throughout the entire stroke of the plunger because the velocity of the plunger will be approximately sinusoidal for the PMLA and SMLA described above. This requirement necessitates a magnetic pole face width that is equal to the stroke length as shown in FIG. 3. FIG. 3 (FIGS. 3A and 3B) shows a set of magnets 62 and a plunger 60. FIG. 3A shows the plunger 60 at maximum left position. FIG. 3B shows the plunger 60 at maximum right position. The SMLA in FIG. 3, and other magnetic coupling designs, such as described in U.S. Pat. No. 5,389,844, can be extended to incorporate multiple stages by using multiple magnets and multiple slots arranged axially in the stator as shown in FIG. 4 (FIGS. 4A, 4B and 4C). The sequence of FIGS. 4A, 4B and 4C depicts a plunger 60 moving across a set of magnets 62 above a center line $C_L$. The SMLA uses four large ring magnets 62 with polarities as shown and a magnetic pole face width (thickness) of $\tau_m$. The plunger 60 passes between the magnets 62. If the magnetic field B is uniform across the gap at a radius r, then the total magnetic flux $\phi$ passing through the core of the coil is as follows:

$$\phi = 2\pi r B k (2x - \tau_m) \qquad (1)$$

Where k is a constant and x is the position of the plunger along the x-axis. From this equation it is evident that the flux varies linearly with the position x of the plunger 60 with zero flux at $x = \tau_m/2$. For variable electric power from the SMLA the plunger 60 will oscillate with variable stroke and variable frequency about the central position where the flux is zero.

The SMLA in FIG. 3, and other magnetic coupling designs, such as described in U.S. Pat. No. 5,389,844, can be extended to incorporate multiple stages by using multiple magnets and multiple slots arranged axially in the stator as shown in FIG. 4. This results in the magnetic flux passing through the power output coils having a sawtooth shape as a function of plunger position along x. For low power requirements, such as when an automatic vehicle is idle, the stroke will be reduced and the plunger 60 will oscillate only along one line of the sawtooth, probably at the center of the linear alternator 20. This line of the sawtooth is represented as the flux equation (1) given above. The electrical power output will then be a simple sine wave. For higher power, the stroke will be lengthened to encompass more lines of the sawtooth flux curve. In this case, the coil winding should be modified to assure a smooth continuous sequence of voltage output. Pole windings must be reversed in direction between adjacent stages to prevent voltage reversals as the plunger moves from state-to-stage.

Figure 5:
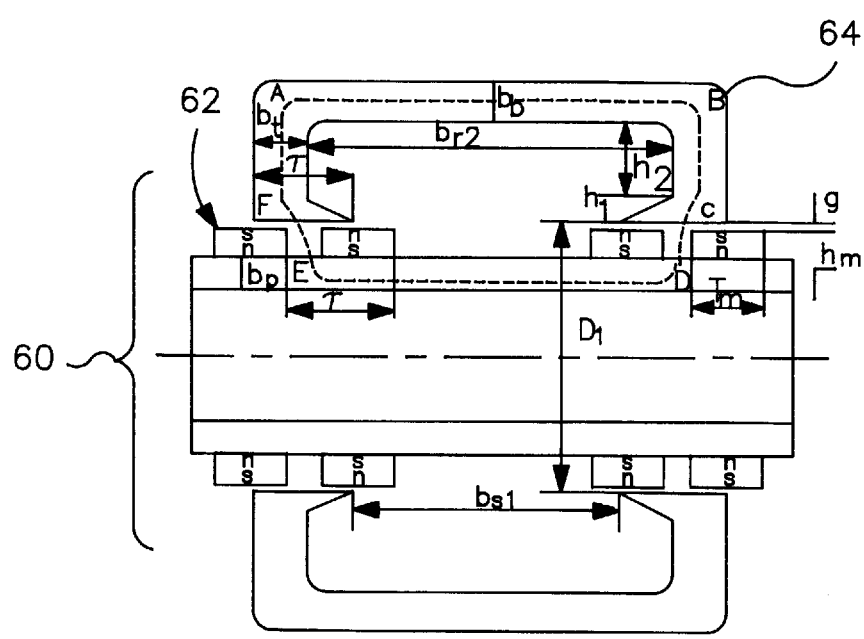
FIG. 5 is a diagram of a representational Permanent Magnet Linear Alternator (PMLA) plunger.

Although it is preferable to use an SMLA, an example of a PMLA, which can also be used, is shown in FIG. 5. The set of magnets 62 is attached to the plunger 60. The plunger 60 passes within the stator 64 to generate AC current. As stated above, because the magnets 62 are part of the plunger 60 they oscillate back and forth and the earth's magnetic field will eventually demagnetize the magnets 62.

The above-mentioned features of the present invention provide the advantages that the linear alternators 20 are directly coupled to internal combustion pistons 24 with a mechanical coupling, such as a turnbuckle 32, to provide rapid variation of piston stroke length while the engine is operating. This provides variable torque and/or variable power at fixed frequency, or variable power with varying frequency. The mechanical coupling permits control of braking of the moving plunger 60 and pistons 28 by means of electronic control of the external load. This electronic braking reduces the kinetic energy of the moving system so that the ideal compression ratio is achieved for maximum fuel efficiency.

The above-mentioned features allow the invention to be used as a vehicular power plant for providing primary electrical power for electric propulsion motors such as those developed by Delco for General Motor's all-electric Impact Vehicle. A transmission or power inverter would not be required due to the variable-power/variable-frequency capability of the linear alternator engine of the present invention. Further, the present invention can be used as a power plant for remote facilities, homes, villages, or towns that are not connected to a main power grid. The variable power output allows matching the power output to the diurnal variation of the power requirements without using supplementary energy/storage systems. This eliminates the need for expensive and short-lived energy storage devices such as batteries or fly-wheels. The linear alternator of the present invention can also be used to power military vehicles, to replace turbo-generators and their associated power-control circuits in heavy equipment such as earth-moving equipment and military tanks, or in mobile electric power generators for military tanks, or in encampments which are remote from electric power grids.

While advantageous embodiments have been chosen to illustrate the subject invention, it will be understood by those skilled in the art that various changes and modifications can be made herein without departing from the scope of the invention as defined by the appended claims.

What is claimed is:

1. A free piston variable stroke generator comprising:
   oscillating means for obtaining a variable stroke;
   alternator means for generating electric current in accordance with the variable stroke from said oscillating means; and
   turnbuckle means connected to said oscillating means for obtaining a variable stroke.

2. A free piston variable stroke generator according to claim 1, wherein said oscillating means includes:
   an internal combustion cylinder;
   a piston;
   a sliding exhaust-port sleeve coupled through which said piston moves; and
   a connecting rod.

3. A free piston variable stroke generator according to claim 2, wherein said turnbuckle means comprises:
   a threaded turnbuckle screw;
   a slotted turnbuckle sleeve having internal threads, said threaded turnbuckle screw located inside said slotted turnbuckle sleeve;
   a sleeve turning gear surrounding said slotted turnbuckle sleeve and including a lug to engage a slot in said slotted turnbuckle sleeve; and
   a selsyn-driven gear engaging said sleeve turning gear to engage said threaded turnbuckle screw.

4. A free piston variable stroke generator according to claim 3, further comprising a selsyn motor for driving said selsyn-driven gear.

5. A free piston variable stroke generator according to claim 4, wherein said connecting rod is a slotted connecting rod having a push-pull bearing at one end engaging said piston.

6. A free piston variable stroke generator according to claim 5, including two oscillating means and one alternator means.

7. A free piston variable stroke generator according to claim 5, including four oscillating means and two alternator means.

8. A free piston variable stroke generator according to claim 5, including 2n oscillating means and n alternator means, n being an integer greater than or equal to 1.

9. A free-piston variable-stroke generator comprising:
   two systems moving in opposing directions, each said system including:
   two internal combustion cylinders;
   two sliding exhaust-port sleeves respectively coupled to said internal combustion cylinders;
   two pistons respectively connected to said two sliding exhaust-port sleeves; and
   two connecting rods having a first end respectively connected to said two pistons;
   two turnbuckles, respectively connected to a second end of said two connecting rods, said two turnbuckles oscillating with said two pistons, respectively;
   a linear alternator coupled between said two turnbuckles and including a plunger, said two pistons being rigidly attached to each side of said plunger through said respective two turnbuckles; and
   means connected to said linear alternator for providing AC output power.

10. A free-piston variable-stroke generator, according to claim 9, further comprising two push-pull bearings respectively connecting said two connecting rods to said two pistons.

11. A free-piston variable-stroke generator, according to claim 10, wherein said connecting rods are slotted connecting rods.

12. A free piston variable stroke generator, comprising:
    an alternator operatively connectable to provide a demanded electric power output;
    an oscillator having a variable stroke and being connected to drive said alternator so that the variable stroke varies in response to the demanded electric power output.

13. The free piston variable stroke generator of claim 12, wherein said alternator includes a plurality of spatially separated magnetic poles.

14. The free piston variable stroke generator according to claim 13, wherein said alternator is a linear alternator coupled to said oscillator to provide alternating current output power.

15. The free piston variable stroke generator according to claim 14, further including:
    a plunger magnetically coupling said oscillator to said spatially separated magnetic poles.

16. The free piston variable stroke generator according to claim 15, wherein said plunger includes a laminated iron core passing between said spatially separated magnetic poles.

17. The free piston variable stroke generator according to claim 16, wherein said magnetic coupling between said plunger and said plurality of spatially related magnetic poles increases when a length of said varying stroke is lengthened, and decreases when the length of said varying stroke is shortened.

18. The free piston variable stroke generator according to claim 17, wherein said varying stroke length increases in response to an increase in said demanded electric power output.

19. The free piston variable stroke generator according to claim 18, wherein said oscillator drives said alternator at a variable frequency.

20. A free piston variable stroke generator according to claim 12, further including a plunger magnetically coupling said oscillator to said alternator, said plunger including a plurality of spatially separated magnets.

* * * * *